Jan. 16, 1962  R. D. SHERO  3,016,952
AUTOMOBILE WINDOW SCREEN
Filed Jan. 21, 1959

INVENTOR
Ronald D. Shero

BY Leonard Michaelson
ATTORNEY 3,016,952
AUTOMOBILE WINDOW SCREEN
Ronald D. Shero, 9160 Jensen Court NE.,
Albuquerque, N. Mex.
Filed Jan. 21, 1959, Ser. No. 788,182
1 Claim. (Cl. 160—354)

This invention relates to insect screens and more particularly to a screen adapted to be used on windows of conventional automobiles.

While window screens have been used in automobiles, disadvantages have accompanied such use. Among such disadvantages existed the problem of adapting a screen of predetermined size to automobile window frames of various shapes and sizes. A further problem of the past was that of collapsing a full size screen to reduced proportions in order that storage thereof in a small glove-compartment sized area would be possible.

One object of this invention is, therefore, to permit standardization in automobile window screens by providing a screen adaptable to automobile window frames of various sizes.

A further object of the instant invention is to provide an automobile window screen which can be conveniently stored in a minimum area by diminishing the area of the screen when storage thereof becomes desirable. Accomplishment of this object enables retention of screens constructed according to the following disclosure aboard a vehicle at all times notwithstanding that the vehicle is of sports-car like dimensions wherein storage space is at a premium.

A further object of this invention is to provide an automobile screen that is simply installed in an automobile window frame and easily retracted therefrom when the use of a screen is no longer demanded.

Other objects of this invention will be readily apparent to one skilled in the art from a further reading of the invention disclosure in the light of the accompanying drawings.

Inasmuch as different automobile makes and models display a variety of side window frame dimensions, the present disclosure illustrates a screen sufficiently versatile to be utilized with most automobiles notwithstanding the aforementioned lack of standardization.

The windows of most automobiles roll into a door frame adapted to receive a window within channels positioned about the periphery of said door frame. Since the windows in most instances are substantially rectangular in shape, window frames are provided with similar configurations.

In accordance with the preceding discussion, the screen described herein is of such construction as to enable the same to be adapted to various shaped window openings that may be encountered in various makes and models of automobiles.

Figure 1:
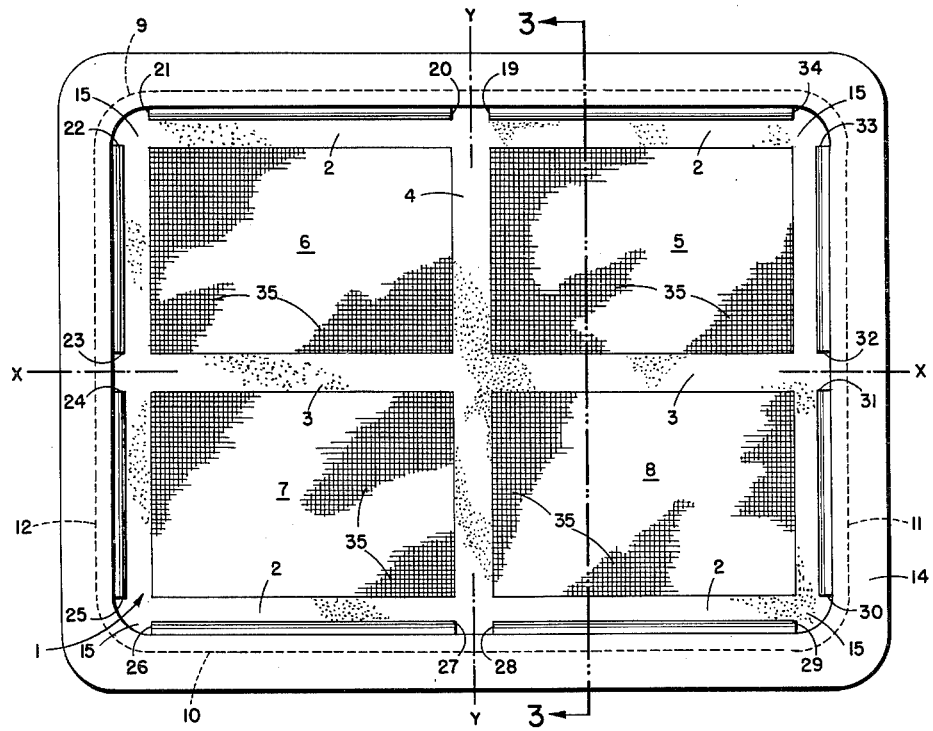
FIGURE 1 is a side elevation of the complete window screen as installed in an automobile window frame.

To this end the peripheral frame member 2, of window screen 1 illustrated in FIGURE 1 of the drawing, is constructed of resilient material as, for example, soft, thin rubber, flexible plastic, etc., having good expansion qualities. In addition to forming frame member 2, said resilient material further forms transverse and longitudinal sections 3 and 4 disposed between substantially rectangular screen areas 5, 6, 7 and 8. The resilient material referred to above, acts as a matrix in a horizontal plane having substantially rectangular areas thereon, said areas being arranged symmetrically in the form of quadrants adapted to accommodate screen fabrics 35 which are securely and continuously connected to said resilient matrix along the peripheral edges thereof.

Resilient peripheral frame 2 is so proportioned that when outward forces are exerted upon it, the outer edges thereof hemmed by magnets 13, will expand and enter channels 9, 10, 11, and 12 provided by the automobile frame 14 for receiving a roll up window. Should channels not be provided, but flat or sheet surfaces provided in lieu thereof, magnets 13 will be attracted to said surfaces in a satisfactory manner.

When said outward forces are applied, expansion of the screen frame is facilitated by the concurrent expansion of transverse and longitudinal sections 3 and 4 along the x and y axes respectively. Expansion of said transverse and longitudinal sections serves to distribute the stress along the inner and outer edges of screen fabrics 35, thereby increasing the durability of the screen and improving uniform expansion thereof. While the latter consideration represents a major improvement over resiliently framed screens of the prior art, the significance of the durability factor of the instant screen device is not to be minimized. Installation of the screen within a window frame, but for the said transverse and longitudinal areas, would produce stresses along the joined sections of magnetic hemming 13 and resilient peripheral frame 2, which would eventually cause failure along the connected edges of frame and magnets. Distribution of stresses between resilient frame 2 and sections 3 and 4 increases durability along the said connected edges by an unexpected degree, thereby greatly extending the useful life of the device.

Figure 2:
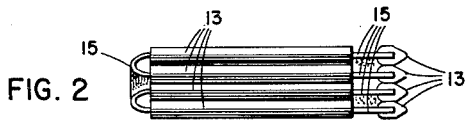
FIGURE 2 represents a front view of the screen as folded along its x and y axes.

A preferred means for occasioning the exertion of forces outwardly about the resilient periphery of screen 1 is presented in the drawing appended hereto. Other means may be utilized and brief mention thereto will be given in the discussion hereinbelow following. Lengths of strong permanent magnets 13 attached to and extending about peripheral resilient frame 2 provide a uniform outward force sufficient to hold the screen securely in aforementioned channels 9, 10, 11 and 12 and further create a desired tautness in the positioned window screen. Magnets 13 are wedge-shaped or oval as best seen in FIGURE 2, thus effecting a tongue in groove relationship between the edges of peripheral frame 2 and said receiving channels.

Installation of screen 1 into the automobile frame 14 is accomplished with facility by first fitting an edge of peripheral frame 2 into receiving position with the top-horizontal length of window channel 9. Inasmuch as window frame channels are of or are surrounded by ferrous metal, magnets 13 will be attracted to and will be held firmly to said channel 9. The end of screen 1, opposite the end already positioned is then pulled downwardly in order that said end opposite the end already positioned may contact lower channel 10 of window frame 14, and be held firmly by virtue of magnetic attraction. At this stage of the installation procedure, the top-horizontal and bottom-horizontal edges of screen 1 are in position. Completion of the installation procedure is accomplished by merely expanding the opposite vertical side edges in order to bring them into contact with their respective side channels 11 and 12. Magnets 13 now furnish the outward forces necessary to retain screen 1 in its installed position.

Uniform expansion and resulting stresses and strains are evenly distributed among resilient peripheral frame 1 and transverse and longitudinal sections 3 and 4. A desirable sealing effect now exists around the entire border or periphery of screen 1. Magnets 13, in addition to providing the necessary holding force, further provide a rigid edge contributing toward obtaining the aforesaid desirable sealing effect.

Removal of screen 1 from window frame 14 is simply accomplished by reversing the installation procedure. That is, by pulling magnetic edges 13 with sufficient force to overcome the binding force between magnets and window frame channels, screen 1 will return to its unexpanded dimensions and may be withdrawn from the window frame vicinity.

The magnetic-edged resilient screen frame construction of the type described finds further advantage at such times when it is desired to retire the screen from service. Such further advantage will become manifest in the course of the following discussion related to storage of the automobile screen.

Figure 4:
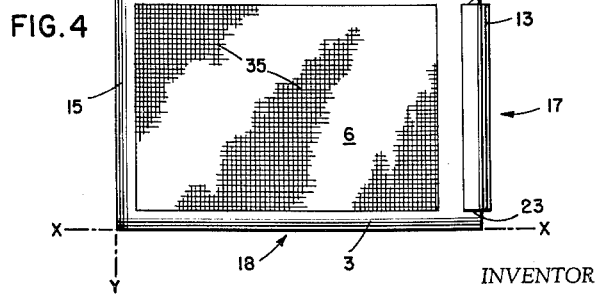
FIGURE 4 is a side elevation of the screen folded along its x and y axes.

Transverse and longitudinal areas 3 and 4, in addition to assisting resilient frame 2 in uniform expansion, permit folding of screen 1 along the $x$ and $y$ axes thereof thereby effecting a four-fold reduction in surface areas of screen 1. In a manner similar to that utilized in folding a two dimensioned, substantially rectangular sheet of flexible material, the screen is first doubled up on itself along a fold the length of the $x$ axis. The screen area at this stage of the folding process is one-half its open area. The once-folded screen is again doubled up on itself along its $y$ axis to give an area one quarter the original screen area. FIGURES 2 and 4 illustrate the twice-folded screen sufficiently compact for convenient storage within the automobile glove compartment or as a suggested alternate, behind an up-hinged sun-visor.

The problem of retaining the screen in its folded position is obviated by virtue of permanent magnets 13. In this regard said magnets 13 function as fastening means serving to hold open sides 16, 17 and 18 securely together. Magnets 13, which extend substantially the lengths of sides 16, 17, and 18, further serve to guard the folded screen against damage occasioned by inadvertent or unavoidable rough handling.

Retention of screen 1 in its folded position by virtue of magnetic attraction is, of course, predicated on the proper polar arrangement of magnets 13 disposed about the peripheral edges of said screen.

Figure 3:
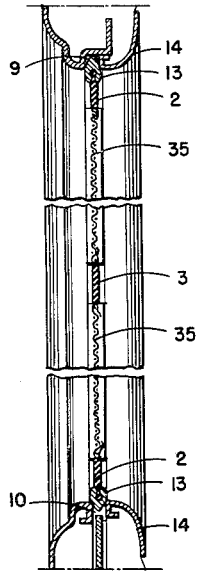
FIGURE 3 is a sectional front view taken along line 3—3 of FIGURE 1.

According to FIGURE 1 it is seen that each edge of screen 1 is comprised of at least two bar magnets disposed with the end regions thereof adjacent to but not contiguous with one another. Said bar magnets are separated by areas of resilient peripheral frame material designated as elements 15 in FIGURE 4. The adjacent ends of magnets 13 are arranged with alternate positive and negative pole regions opposite one another. End regions 20, 22, 24, 26, 28, 30, 32 and 34, may be of positive polarity and end regions 19, 21, 23, 25, 27, 29, 31, and 33 of negative polarity or vice versa. Folding screen 1 as heretofore described will dispose magnets 13 in respective parallel courses forming a stack comprised of four bar magnets along sides 16 and 17 as shown in FIGURES 3 and 4.

The foregoing polar arrangement provides alternate positive and negative magnetic fields between contiguous lengths of magnets 13 disposed in said parallel courses. Said sides 16 and 17 will therefore be held together according to the laws of polar attraction.

From the foregoing it will be understood that there has been provided a new and novel automobile screen unit wherein a screen of such aforementioned resilient and versatile nature is readily adapted to fit a plurality of differently shaped automobile window frames. It has been shown how the resilient frame member in conjunction with resilient transverse and longitudinal sections cooperate to provide a screen which can be conveniently folded and stored during periods of non-use. It has been further shown how the device is of simple construction and is capable of utilization with a minimum of effort. The use of the operation and compact storing feature of the foldable screen have also been explained in connection with the invention.

An apparent conclusion reached in the light of the foregoing is that several modifications of the device could be resorted to without the exercise of invention. Such modifications could reasonably include alteration of the configuration of the component frame members that comprise the adjustable frame. To that end it is possible to foresee the use of peripheral frame components in place of the permanent magnets utilized in conjunction with this invention, as for example, expandable tube and rod components slidably adapted and spring loaded to urge rod and tube apart and thus tensionally maintain the periphery of the resilient frame in proper engagement with a window frame. Suction cups, hooks, snaps, adhesive tape, etc., are modifications within the realm of those skilled in the art. However, the use of magnets in place of the foregoing feasible embodiments carries with it the discussed advantages attendant when the screen is folded and stored as a self contained unit.

Other modifications of similar scope and equivalence may be resorted to without departing from the spirit thereof or the scope of the appended claim.

What is claimed is:

A window screen for a vehicle comprised of a rectangularly shaped highly elastic planar matrix defined by four peripheral edges, four symmetrically oriented rectangular openings positioned within said elastic matrix, a rectangular screen fabric having four peripheral edges secured within each of said openings, there being two outer peripheral edges of each of said screen fabrics in parallel spaced relation with respect to the peripheral edges of the said planar matrix, and two inner peripheral edges of each of said screen fabrics in spaced parallel relation with respect to an edge of two other of the said screen fabrics, a pair of bar magnets secured to each of the said four peripheral edges of said elastic planar matrix, each of the said bar magnets having a north pole and a south pole, each of said bar magnets being parallel with and extending the length of a said outer peripheral edge of a corresponding screen fabric, the north pole of each bar magnet being arranged in spaced, linear and end-to-end relation with respect to the south pole of another bar magnet, said window screen being adapted for being twice doubled up on itself and for magnetic retention in said twice doubled up position.

References Cited in the file of this patent

UNITED STATES PATENTS

| | | |
|---|---|---|
| 1,614,010 | Martinov | Jan. 11, 1927 |
| 1,926,429 | Bendelari | Sept. 12, 1933 |
| 2,532,886 | Branchi | Dec. 5, 1950 |
| 2,595,833 | Flaherty | May 6, 1952 |
| 2,722,978 | Frisk | Nov. 8, 1955 |
| 2,776,709 | Lawlor | Jan. 8, 1957 |